United States Patent

Bastacky et al.

[11] Patent Number: 6,161,749
[45] Date of Patent: Dec. 19, 2000

[54] METHOD AND APPARATUS FOR HOLDING A PRINTED CIRCUIT BOARD DURING ASSEMBLY

[75] Inventors: Jeremy A. Bastacky, Irmo, S.C.; Robert Reilly, Tampa, Fla.

[73] Assignee: Ericsson, Inc., Research Triangle Park, N.C.

[21] Appl. No.: 09/114,688

[22] Filed: Jul. 13, 1998

[51] Int. Cl.[7] .............................. B23K 37/04; B23K 31/02
[52] U.S. Cl. .................... 228/49.5; 228/212; 228/44.7; 29/743; 29/281.1
[58] Field of Search .................................. 228/212, 44.3, 228/44.7, 48, 49.1, 49.5; 269/903; 29/281.1, 743

[56] References Cited

U.S. PATENT DOCUMENTS

| | | | |
|---|---|---|---|
| 3,355,078 | 11/1967 | Smith | 228/44 |
| 3,736,651 | 6/1973 | Law et al. | 29/428 |
| 4,291,867 | 9/1981 | Williams et al. | 269/43 |
| 4,292,116 | 9/1981 | Takahashi et al. | 156/566 |
| 4,421,305 | 12/1983 | Kosmowski | 269/287 |
| 4,436,806 | 3/1984 | Rendulic et al. | 430/311 |
| 4,463,636 | 8/1984 | Heller et al. | 83/13 |
| 4,795,518 | 1/1989 | Meinel et al. | 156/285 |
| 5,044,615 | 9/1991 | Newman et al. | 269/231 |
| 5,242,096 | 9/1993 | Tsunabuchi et al. | 228/9 |
| 5,249,343 | 10/1993 | Grosso et al. | 29/281.4 |
| 5,337,893 | 8/1994 | Nami et al. | 206/329 |
| 5,447,886 | 9/1995 | Rai | 437/183 |
| 5,738,165 | 4/1998 | Imai | 165/80.2 |
| 5,792,268 | 7/1998 | Averell | 118/500 |
| 5,794,329 | 8/1998 | Rossmeisl et al. | 29/743 |
| 5,911,329 | 6/1999 | Wark et al. | 211/41.17 |
| 5,918,362 | 7/1999 | Yamashita et al. | 29/743 |
| 5,927,589 | 7/1999 | Yang | 228/44.7 |
| 5,932,065 | 8/1999 | Mitchell | 156/566 |
| 6,008,476 | 12/1999 | Neiconi et al. | 219/388 |

*Primary Examiner*—Samuel M. Heinrich
*Assistant Examiner*—L. Edmondson
*Attorney, Agent, or Firm*—Coats & Bennett, P.L.L.C.

[57] ABSTRACT

A circuit board holder is used to hold warped circuit boards in a substantially flat disposition while components are assembled onto the circuit board. The holder comprises a base plate and a carrier plate. The base plate is designed to fit into a specific machine. The carrier plate is supported by the base plate and is designed to receive and hold circuit boards with a specific board panelization and layout. The carrier plate includes a substantially flat board support surface. Circuit boards are placed on the board support surface of the carrier plate. The circuit boards are held against the board support surface of the carrier plate by vacuum.

8 Claims, 3 Drawing Sheets

METHOD AND APPARATUS FOR HOLDING A PRINTED CIRCUIT BOARD DURING ASSEMBLY

FIELD OF THE INVENTION

The present invention relates generally to a method of fabricating printed circuit boards and, more particularly, to a method and apparatus for holding the printed circuit board in a substantially flat disposition while components are assembled onto the board.

BACKGROUND OF THE INVENTION

In recent years, surface mount device technology (SMDT) has become prevalent in the electronics industry. Surface mount devices (SMDs) and printed circuit boards using this technology have a series of solder pads thereon. To mount the SMDs to the printed circuit board, a solder paste is applied on the solder pad of the printed circuit board typically by screen printing or stencil printing. The surface mount device is placed on top of the solder paste. The solder paste is heated to reflow the solder and join the solder pads on the SMD with the solder pads on the printed circuit board. Adhesives may be used to retain the SMDs in position during the solder reflow process.

A problem that is often encountered in the fabrication of printed circuit boards using surface mount technology is warped printed circuit boards. Circuit board manufacturers usually allow a tolerance of 0.060 inches variance from one corner to a diagonally opposite corner of the board. When heat is applied to the board during the solder reflow process, additional warping may occur. Warping of the printed circuit board has an adverse affect on yields because it directly affects other parts of the fabrication process. For example, capacitors and resistors are very small, typically 0.040× 0.020 inches. If a board is warped, the components can bounce off or drop inaccurately onto the printed circuit board. Warped boards effect coplanarity of components, x-y origin offsets, and repeatability of component placement. It is therefore desirable to devise new methods of thicker board fabrication which effectively deals with the problem of board warping. A solution to this problem would result in greater yields and a concomitant reduction in cost of manufacturing of printed circuit boards.

SUMMARY OF THE INVENTION

The present invention relates to a method and apparatus which is used in the fabrication of printed circuit boards using surface mount device technology. In particular, the present invention relates to a method and apparatus for holding a printed circuit board while components are assembled onto the board. The circuit board holder includes one or more flat board support surfaces on which the printed circuit board rests. The board support surfaces provide a relatively large support area as compared to prior art devices. The printed circuit board is held against the board support surface by vacuum. Vacuum cups are disposed on the board support surfaces to grip the printed circuit boards and hold the board down against the board support surfaces. The vacuum cups are connected to a vacuum source by passages extending through the board holder.

In the preferred embodiment of the invention, the board holder includes a mother plate and a daughter plate. The mother plate is machine specific. The daughter plates are specific to a circuit board panelization and layout. This design makes changeover from one circuit board panelization to another relatively quick and easy. To change the setup, the daughter board is simply removed from the mother board and a different daughter board is installed.

The circuit board holder can be manufactured to a very tight tolerance. By using a vacuum to hold the printed circuit board flat against the circuit board holder, the problem of warping is substantially overcome. Using the circuit board holder of the present invention, yields are increased by approximately 3% to 5% as compared to prior art devices.

DETAILED DESCRIPTION OF THE INVENTION

Figure 1:
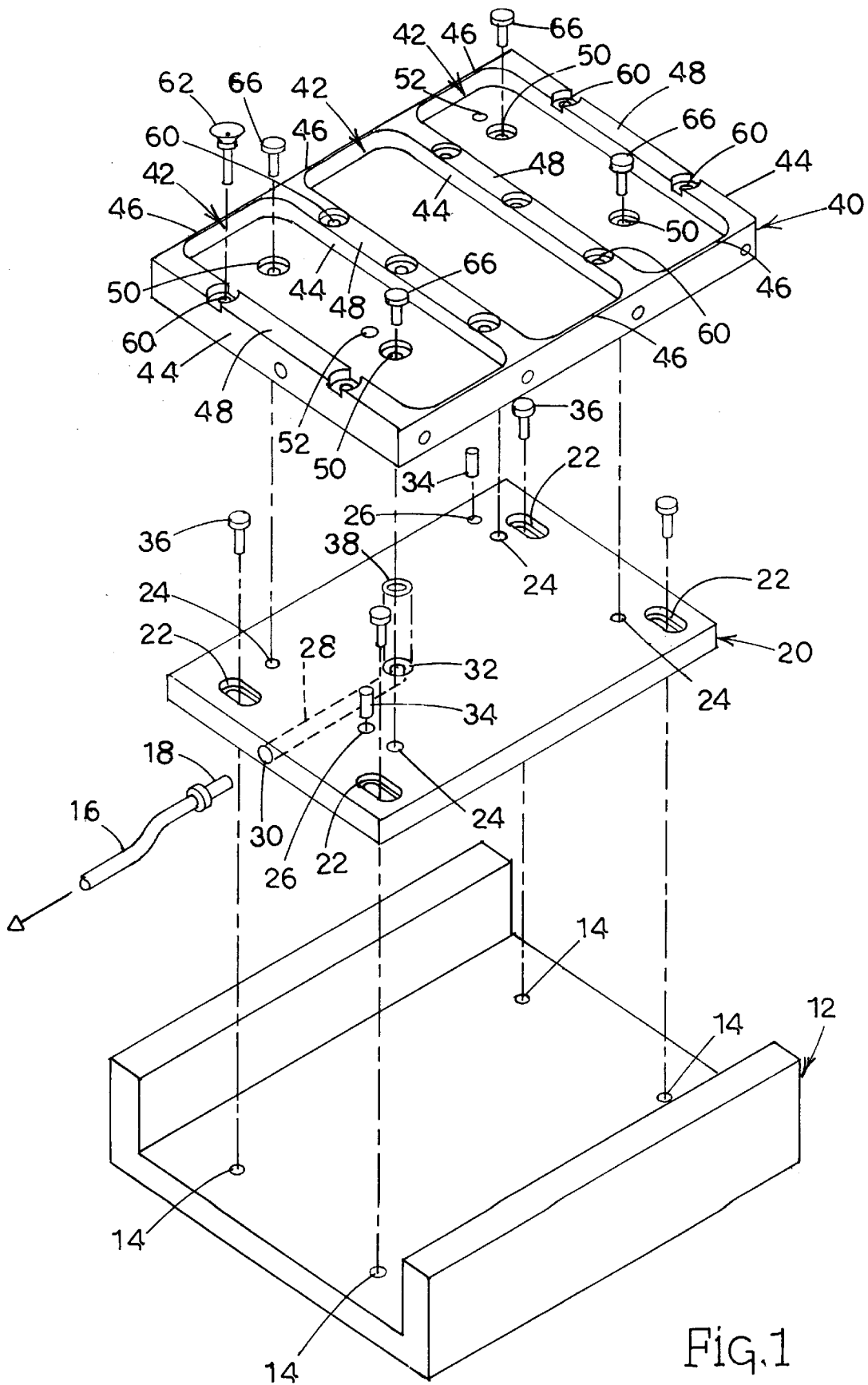
FIG. 1 is an exploded perspective view of the circuit board holder of the present invention.

Referring now to the drawings, and particularly to FIG. 1, the circuit board holder 10 of the present invention is shown therein and indicated generally by the numeral 10. The circuit board holder 10 mounts to a conveyor 12 which transports the circuit board along an assembly line. In general, the conveyor 12 transports the circuit board holder, with a circuit board mounted thereon sequentially to a screening station, an IC placement station, a heating station, and a cooling station. At the screening station, a solder paste is screened onto the surface of the printed circuit board. The solder paste covers the contact pads on the printed circuit board. At the placement station, IC chips or other electronic devices are placed onto the surface of the printed circuit board with the contact pads of the IC chips bearing on the deposited solder paste. The IC chips are held in place by either the solder paste or by a separate adhesive. The printed circuit board is then transported to a heating station where the holder and board are heated to the reflow temperature of the solder. Heating causes the solder in the solder paste to flow and provide electrical and mechanical connection between the IC chips and the printed circuit boards. Heating can be accomplished by convection from heated gases, by radiation or by other means. The solder reflow step is followed by a cooling step which cools the printed circuit board and the holder from the reflow temperature of the solder to ambient temperature. After cooling, the printed circuit boards are removed from the holder.

During the fabrication of printed circuit boards, it is usually necessary to precisely control the placement, alignment, and orientation of the IC chips. Misplaced or misaligned components may result in improper functioning or failure of the circuit board. One cause of misplaced or misaligned components is warping of the printed circuit boards. Warping may be caused by inherent stresses in the board or by stresses created when the board is heated during the solder reflow step. The circuit board holder 10 of the present invention is designed to hold the printed circuit board in a substantially flat condition throughout the fabrication process.

The circuit board holder 10 generally comprises a base plate 20 and a carrier plate 40. Base 20 is designed to fit a specific machine. The carrier plate 40 is designed for a specific circuit board panelization and layout. It is contemplated that multiple carrier plates 40 may be used, each having a different board panelization and layout. Each individual carrier plate 40 is designed to mount onto a common base plate 20. In other words, the carrier plates 40 are interchangeable with one another. The interchangeability of the carrier plates 40 facilitates changeover between production runs.

Figure 2:
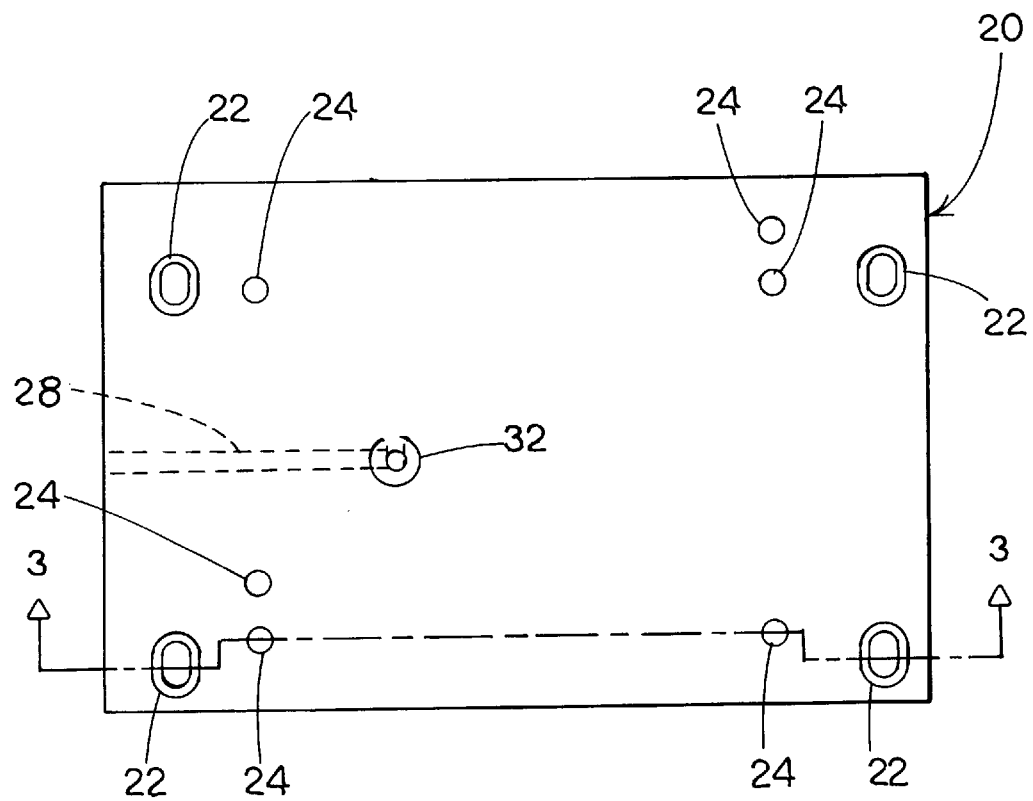
FIG. 2 is a plan view of the base plate of the circuit board holder.
Figure 3:
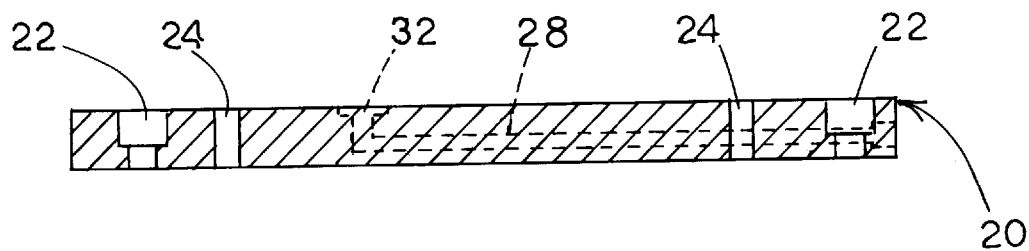
FIG. 3 is a section view of the base plate taken along line 3—3 of FIG. 2.

Referring now to FIGS. 2 and 3, the base plate 20 is shown in more detail. The base plate 20 is made of aluminum, or other suitable material, and has a generally rectangular configuration. Base plate mounting holes 22 are disposed adjacent each of the four corners of the base plate 20. Base plate mounting holes 22 are elongated and counter sunk. Mounting screws 36 pass through the base plate mounting holes 22 and thread into corresponding openings 14 in the conveyor 12 to secure the base plate 20 on the conveyor 12.

The base plate 20 also includes four threaded holes 24 for attaching the carrier plate 40 and two dowel holes 26. The threaded holes 24 extend from the top surface of the base plate 20 to the bottom surface and are internally threaded to receive carrier plate mounting screws 66 as will be hereinafter described. The dowel holes 26 have smooth walls and are adapted to receive dowel pins 34. The dowel pins 34 are press fit into corresponding dowel holes 26 in the base plate 20. The purpose of the dowel pins 34 is to align the carrier plate 40 on the base plate 20 as will be hereinafter described.

A vacuum passage 28 is formed in the base plate 20. The vacuum passage 28 extends from an inlet opening 30 formed in one end of the base plate 20 to an outlet opening 32 in the top surface of the base plate 20. The outlet opening 32 includes a counter bore which receives an O ring 38. The vacuum passage 28 is connected by a vacuum line 16 and hose coupling 18 to a vacuum source (not shown).

Figure 4:
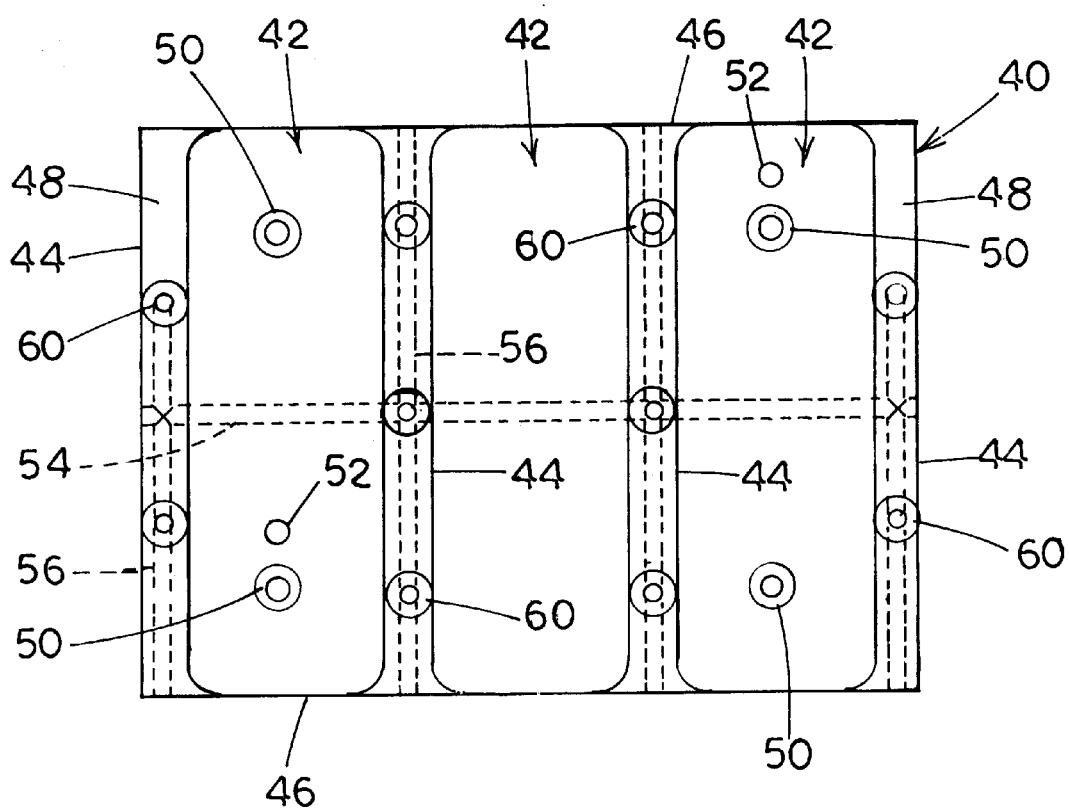
FIG. 4 is a plan view of the carrier plate of the circuit board holder.
Figure 5:
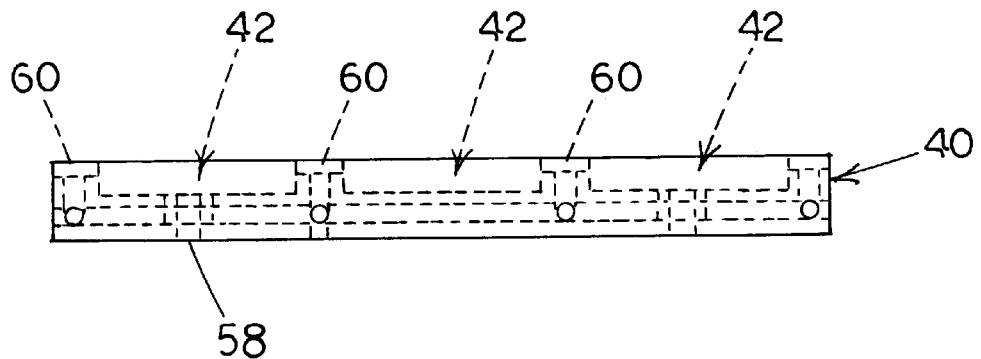
FIG. 5 is a section view of the carrier plate taken through line 5—5 of FIG. 4.

Referring now to FIGS. 4 and 5, the carrier plate 40 is shown in more detail. The carrier plate 40 has a generally rectangular configuration and is made of aluminum. The carrier plate 40 has a flat bottom surface (not shown) which bears on the top surface of the base plate 20. A plurality of recesses 42 are formed in the top surface of the carrier plate 40. The recesses 42 are surrounded by walls 44 and 46. Walls 44 extend along the ends of the base plate 20 as well as between cavities 42. Walls 46 extend along the sides of the base plate 20 generally perpendicular to the cavities 42. The top surface of each wall 44 comprises a board support surface 48 for supporting the printed circuit board. The board support surfaces 44 are all coplanar.

Carrier plate mounting holes 50 are formed in the carrier plate 40. The carrier plate mounting holes 50 each include a counter bore and aligns with a corresponding threaded hole 24 in the base plate 20. Screws 66 pass through the carrier plate mounting holes 50 and thread into the threaded holes in the base 22 to secure the carrier plate 40 to the base plate 20.

A pair of alignment holes 52 extend through the carrier plate 40 and align with the dowel pins 34 on the base plate 20. When the carrier plate 40 is mounted onto the base plate 20, the dowel pins 34 extend into the alignment holes 52 in the carrier plate 40 to align the carrier plate 40 on the base plate 20. It will be readily apparent to those skilled in the art that other alignment means may also be used. For example, the base plate 20 and carrier plate 40 could be formed with interlocking parts such as a groove and spline. The present invention is intended to encompass any known means for aligning two components with respect to one another.

Each of the board support surfaces 48 has one or more vacuum ports 60 formed therein. The vacuum ports 60 are recessed slightly from the board support surface 48 to accommodate a vacuum bellows 62. A transverse vacuum passage 56 extends generally parallel and underneath each wall 44. The transverse vacuum passages 56 are interconnected by a single longitudinal passage 54. The longitudinal passage 54 intersects an inlet opening 58 in the bottom surface of the carrier plate 40. The inlet opening 58 aligns with the outlet opening 32 on the base plate 20.

In use, a carrier plate 40 is selected and secured to the base plate 20. A printed circuit board is placed on top of the carrier plate 40. The printed circuit board rests on the board support surfaces 48 of the carrier plate 40. A vacuum is applied at the inlet 30 in the base plate 20. When the vacuum source is activated, a vacuum is drawn through the base plate 20 and carrier plate 40. The vacuum pulls the printed circuit board down against the board support surfaces 48 on the carrier plate 40. The vacuum serves to hold the board in a substantially flat disposition while electronic components are assembled onto the board. The vacuum is maintained during the screening step, placement step, heating step and cooling step.

The main advantage of the present invention is that warped printed circuit boards are held in a substantially flat disposition during the fabrication process. Using the present invention, boards can be held in a substantially flat disposition with a tolerance of a few thousandths of an inch. By holding the printed circuit boards in a substantially flat disposition during fabrication, there are fewer misplaced and misaligned components as compared to prior art holders. Eliminating misplacement of components results in an improvement in the yield of usable circuit boards.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A circuit board holder comprising:
   a. a base plate adapted to mount to a conveyor, said base plate having a vacuum passage extending to an outlet opening;
   b. a carrier plate removably mounted to said base plate and being substantially parallel with said base plate, said carrier plate having a board support surface for supporting a printed circuit board thereon, said board support surface having raised walls positioned along at least one exterior edge and at least one interior section of said carrier plate, said carrier plate having an inlet opening that aligns with said outlet opening;
   c. one or more vacuum ports formed in said board support surface and being operatively connected to a vacuum source through said inlet opening, whereby when a vacuum is applied said circuit board is held in contact with said board support surface by said vacuum.

2. The circuit board holder according to claim 1 wherein said carrier plate includes a plurality of board support surfaces.

3. The circuit board holder according to claim 2 wherein said carrier plate includes one or more recesses disposed between said board support surfaces.

4. The circuit board holder according to claim 1 wherein said carrier plate includes one or more vacuum passages connected to said vacuum ports in said board support surface.

5. The circuit board holder according to claim 4 wherein said base plate includes one or more vacuum passages which communicatively connect to said vacuum passages in said carrier plate when said carrier plate is mounted to said base plate.

6. The circuit board holder according to claim 1 further including alignment means for aligning said carrier plate on said base plate.

7. The circuit board holder according to claim 6 wherein said alignment means comprises an alignment pin on one of said base plate and said carrier plate, and an alignment opening in the other of said base plate and said carrier plate.

8. A method of manufacturing a printed circuit board comprising:

a. mounting a carrier plate onto a holder, the holder having a substantially flat board support surface and a vacuum passage operatively connected to a vacuum source, the carrier plate having a first substantially planar side for mounting against the flat board support surface, and a second side having raised walls positioned along at least one interior section;

b. mounting the circuit board onto the raised walls of the carrier plate second side;

c. applying a vacuum through the vacuum passage and inlet opening to hold the circuit board in contact with the raised walls of the carrier plate second side to reduce the warping of the circuit board;

d. applying solder to said printed circuit board while maintaining said vacuum;

e. placing components onto the printed circuit board while maintaining said vacuum;

f. heating said circuit board to reflow the solder while maintaining said vacuum; and g. cooling the circuit board while maintaining said vacuum.

* * * * *